United States Patent Office 2,824,060
Patented Feb. 18, 1958

2,824,060

BEARING COMPOSITIONS CONTAINING POLYTETRAFLUOROETHYLENE AND POLYTRIFLUOROCHLOROETHYLENE

Hobart S. White, Bethesda, Md., assignor to the United States of America as represented by the Secretary of the Navy No Drawing. Application October 15, 1954
Serial No. 462,634

17 Claims. (Cl. 252—12.2)

(Granted under Title 35, U. S. Code (1952), sec. 266)

The invention described herein may be manufactured and used by or for the Government of the United States of America for governmental purposes without the payment of any royalties thereon or therefor.

This invention relates to oil-free bearing compositions.

In my copending application Serial No. 446,685, filed July 29, 1954, now Patent No. 2,715,617, an oil-free bearing composition is described which contains polytetrafluoroethylene reinforced by molybdenum or tungsten powders. For many uses this composition is desirable, but I have discovered that a composition containing a substantial percentage of polytrifluorochloroethylene with the polytetrafluoroethylene and filler of the prior composition has important advantages as an oil and grease free bearing material.

The important objects of this invention are to provide a bearing composition which has a relatively low coefficient of friction; which may be used for bearings without accompanying use of oils or greases; which is not only usable as a bearing without added lubricants but also has substantial body and toughness to insure satisfactory pressure resistance and life; and which is usable over a temperature range particularly met with in aircraft instruments, as −60° C. to 75° C., as well as wider range uses.

In the composition, as hereinabove indicated, the main constituent elements are polytetrafluoroethylene, and polytrifluorochloroethylene.

The polytetrafluoroethylene element is a thermoplastic substance in powdered form serving primarily to provide low-friction and low-wear properties in the composition. This substance is known commercially as Teflon, has a molecular weight ranging from 500,000 to 10,000,000 and is available as an aqueous suspensoid in toluene and water known commercially as Teflon Clear Finish in which the polytetrafluoroethylene is about 44.0%, with water 47.4% and toluene 6.0%, the balance consisting of long chain alcohols. In this form the polytetrafluoroethylene has a particle size ranging from 0.05 to 5.0 microns but there is no limitation specifically to this size range since, for shafts exceeding one eighth inch, particle sizes up to 100 microns diameter are satisfactory. For small sized shafts, i. e., less than one sixty-fourth inch in diameter, particle sizes not exceeding ten microns are desirable so that the bearing will present a suitably uniform surface texture consistent with the size of the shaft.

The polytrifluorochloroethylene is a thermoplastic material serving primarily as a binder and available commercially as a dispersion in xylol (Kel FN1 Dispersion) in which the polytrifluorochloroethylene is present to about 34.0%. Polytrifluorochloroethylene is characterized by a molecular weight ranging from 76,000 to 110,000 in the unplasticized state with the corresponding no-strength temperatures ranging from about 210° C. to 350° C. Before fusing, preferably, this thermoplastic is in the form of particles varying from 0.05 to 5.0 microns in size, dispersed in a suitable liquid.

Fillers, optionally, may be used in the composition to give added body and toughness to the bearing structure. These fillers vary in kind and physical properties and may include for example, metals powders, such as those of molybdenum and tungsten, glass powder, and pigments, such as chromium tetrahydrate, subject to restrictions on particle size or fibre diameter to 0.05 to 100 microns.

In preparing the bearing composition, a mixture of the constituent elements is prepared, the range of the percentages of the materials in the finished bearing composition being as follows:

| | Percent by weight |
|---|---|
| Polytrifluorochloroethylene | 10 to 60 |
| Polytetrafluoroethylene | 10 to 80 |
| Fillers or pigments | 0 to 80 |

The parts are mixed together to form a paste which is compressed to form a slug and dried. The slug is then subjected to a temperature treatment within a range between about 400° F. and 600° F., depending on the molecular weight of the polytrifluorochloroethylene. In general, polytrifluorochloroethylene, commercially described as No. 300 NST (symbolizing 300° C. no strength temperature, 210° C. to 350 C. being usable) is suitable for the compositions of this invention, and a temperature of about 500° F. is adequate for fusing. Temperatures much greater than that necessary to fuse the polytrifluorochloroethylene should not be used, since they cause decomposition and degradation of this substance. Fusion of the polytrifluorochloroethylene is necessary since this substance serves primarily as a bonding element, whereas the anti-friction function of the polytetrafluoroethylene is derived from the powdered form thereof as existing prior to fusion. In general, also, the mixtures of the substances are compressed before or during the fusing step at pressures ranging from about 500 to 15,000 pounds per square inch (p. s. i.).

The following examples illustrate specific methods and compositions of the invention. In these examples, the polytrifluorochloroethylene is in the form of a dispersion in xylol of about 34.0% and the polytetrafluoroethylene in the form of a suspensoid of about 44.0% and in these forms the constituents will be referred to respectively by the terms Dispersion and Suspensoid. In Example 4, a suspensoid is used containing the pigment, chromium tetrahydrate, this suspensoid being known commercially as Teflon One Coat Enamel and containing finely divided polytetrafluoroethylene 34.6%, chromium tetrahydrate 9.0%, water 49.5%, toluene 4.8, and long chain alcohols. This suspensoid will be referred to in the example as pigmented.

Example 1

This composition is made from polytrifluorochloroethylene dispersed in xylol known as Kel F N1 Dispersion, polytetrafluoroethylene aqueous suspensoid known as Teflon Clear Finish, and molybdenum metal powder classified as having a particle size ranging from 0.5 to 5 microns. Sixty grams of Dispersion and 30 grams of Suspensoid are mixed by stirring in a beaker, and then 60 grams of molybdenum powder are added while stirring to form a paste. The mixture is allowed to dry until it becomes a very stiff paste. The stiff paste is transferred to a heavy-walled steel tubing, steel plungers are inserted in each end, and pressure is applied to form a slug of the composition free of voids. The slug is removed and dried on a hot plate or other suitable means at temperatures not exceeding 300° F. The dried slug is inserted in the steel tubing, the steel plungers are inserted in the ends and a small load is applied with a hydraulic press. A moving flame is applied to the outer wall of the steel tubing until a 500° F. Tempilstick indicates a temperature of 500° F. when stroked on the cylinder wall. After maintaining this temperature for about 5 minutes, the load from the hydraulic press is increased until the computed pressure at the ends of the steel plungers is about 13,000 p. s. i., and the flame is removed. The pressure decreases while the sample is cooling. Any time after cooling below about 200° F. the finished sample is removed from the steel tubing.

*Example 2*

A mixture as follows is prepared:

| | Parts, weight |
|---|---|
| Dispersion | 100 |
| Suspensoid | 100 |
| Acetone | 200 |

This mixture is blended in a Waring blender for about 5 minutes and then poured into a beaker. After settling of the coagulated mass most of the liquid is decanted. Further removal of liquid is accomplished with absorbent paper. When dried enough to form a stiff paste the composition is pressed in a steel tubing at 3,000 p. s. i. to form a slug of material free from voids. The slug is removed and dried on a hot plate at about 300° F. The dried slug is inserted in the steel tubing and molded as described in Example 1, with a computed pressure of 13,000 p. s. i. at 500° F.

*Example 3*

A mixture as follows is prepared:

| | Parts, weight |
|---|---|
| Dispersion | 60 |
| Suspensoid | 60 |
| Fiber glass, avg. diam.=2 microns | 5 |
| Acetone | 240 |

This mixture is blended in a Waring blender for about 15 minutes and then prepared in the manner described in Example 2, with a computed pressure of 10,000 p. s. i. at 500° F.

*Example 4*

A mixture is prepared as follows:

| | Parts, weight |
|---|---|
| Dispersion | 60 |
| Pigmented Suspensoid | 80 |
| Acetone | 150 |

This mixture is blended in a Waring blender for about 10 minutes and then prepared in the manner described in Example 2, with a computed pressure of 3,000 p. s. i. and 500° F.

The approximate composition, percentage by weight, of the finished samples of these four examples are as follows:

| Example | Polytrifluoro-chloroethylene | Polytetra-fluoro-ethylene | Other material |
|---|---|---|---|
| 1 | 20 | 18 | 62 molybdenum. |
| 2 | 37 | 63 | none. |
| 3 | 33 | 58 | 9 fiber glass. |
| 4 | 36 | 51 | 13 chromium tetrahydrate. |

It is pointed out that the thermoplastics, polytrifluorochloroethylene and polytetrafluoroethylene, constitute the primary elements of the composition and they may be used alone or with other elements as specific needs dicate. The substances added, such as metal powders, fiber glass, glass powder and pigments, may cover a wide range provided only that they do not detract from the desired low-friction and low-wear properties of the primary thermoplastics.

In comparative tests with commercially available oil-free bearings, the composition including polytrifluorochloroethylene and polytetrafluoroethylene only, for example, showed, as a bearing, a coefficient of friction of 0.22 at 15.0 revolutions per minute, or 1.0 foot per minute, as applied to a hardened one-quarter inch stainless steel shaft at room temperature with a 643 gram load. This compares with 0.28, and 0.27 for bearings of electrographitic carbon and silver, and electrographitic carbon and babbitt, respectively, under identical conditions. Also, the rate of wear in milligrams per hour at 150 revolutions per minute under 2000 grams load for the same shaft was 0.0021 for the plastic bearings as compared to 0.009 and 0.0077 for the other substances mentioned.

It is noted that the stated composition, while primarily usable for instrument bearings operating in the temperature range of —60° C. and 75° C., may also be advantageously employed for analogous uses and temperature rages from —200° C. to 150° C.

Obviously many modifications and variations of the present invention are possible in the light of the above teachings. It is therefore to be understood that within the scope of the appended claims the invention may be practiced otherwise than as specifically described.

What is claimed is:

1. An oil- and grease-free bearing composition consisting essentially of a mixture of polytrifluorochloroethylene having a molecular weight ranging from 76,000 to 110,000 and polytetrafluoroethylene having a molecular weight ranging from 500,000 to 10,000,000 in the proportions by weight of 20 to 60% polytrifluorochloroethylene and 80 to 40% polytetrafluoroethylene.

2. An oil- and grease-free bearing composition consisting of a mixture of polytrifluorochloroethylene having a molecular weight ranging from 76,000 to 110,000 to the amount of 10 to 60% by weight and polytetrafluoroethylene having a molecular weight ranging from 500,000 to 10,000,000 to the amount of 10 to 80% by weight, and a filler selected from the group consisting of molybdenum, tungsten, glass and chromium tetrahydrate to the amount of 0 to 80% by weight.

3. An oil- and grease-free bearing composition consisting of a mixture of the thermoplastics polytrifluorochloroethylene having a molecular weight ranging from 76,000 to 110,000 and polytetrafluoroethylene, and a filler forming from 0 to 80% by weight of the composition and having a particle size or fibre diameter between 0.05 and 100 microns and selected from the group consisting of molybdenum, tungsten, glass and chromium tetrahydrate, each of the thermoplastics being present in the composition to an amount not less than 10% by weight with the polytrifluorochloroethylene not exceeding 60% by weight and the polytetrafluoroethylene not exceeding 80% by weight.

4. A bearing composition consisting by weight of polytrifluorochloroethylene 37%, and polytetrafluoroethylene 63%, said polytrifluorochloroethylene having a molecular weight ranging from 76,000 to 110,000 and said polytetrafluoroethylene having a molecular weight ranging from 500,000 to 10,000,000.

5. A bearing composition consisting by weight of polytrifluorochloroethylene 20%, polytetrafluoroethylene 18%, and molybdenum 62%, said polytrifluorochloroethylene having a molecular weight ranging from 76,000 to 110,000 and said polytetrafluoroethylene having a molecular weight ranging from 500,000 to 10,000,000.

6. A bearing composition consisting by weight of polytrifluorochloroethylene 33%, polytetrafluoroethylene 58%, and fiber glass 9%, said polytrifluorochloroethylene having a molecular weight ranging from 76,000 to 110,000 and said polytetrafluoroethylene having a molecular weight ranging from 500,000 to 10,000,000.

7. A bearing composition consisting by weight of polytrifluorochloroethylene 36%, polytetrafluoroethylene 51%, and chromium tetrahydrate 13%, said polytrifluorochloroethylene having a molecular weight ranging from 76,000 to 110,000 and said polytetrafluoroethylene having a molecular weight ranging from 500,000 to 10,000,000.

8. The bearing composition as defined in claim 2, the particle size of the polytetrafluoroethylene not exceeding 5.0 microns.

9. The bearing composition as defined in claim 2, the particle size of the polytetrafluoroethylene ranging between 0.05 and 5.0 microns.

10. The bearing composition as defined in claim 3, the particle size of the polytetrafluoroethylene ranging from 0.05 to 5.0 microns.

11. The bearing composition as defined in claim 3, the particle size of the polytetrafluoroethylene ranging from 0.05 to 100.0 microns.

12. The process of forming a bearing from thermoplastic stock which consists essentially of mixing powdered polytrifluorochloroethylene having a molecular weight ranging from 76,000 to 110,000 and powdered polytetrafluoroethylene having a molecular weight ranging from 500,000 to 10,000,000, in a liquid suspending medium, drying the mixture and compressing the mixture at a temperature sufficient to fuse but insufficient to decompose the polytrifluorochloroethylene with a pressure of between 500 to 13,000 pounds per square inch to form a product having 10 to 60% polytrifluorochloroethylene and 10 to 80% polytetrafluoroethylene.

13. The process of forming a bearing from thermoplastic stock and metal filler, which consists essentially of mixing powdered polytrifluorochloroethylene having a molecular weight ranging from 76,000 to 110,000 and powdered polytetrafluoroethylene having a molecular weight ranging from 500,000 to 10,000,000 in a liquid media and adding powdered molybdenum in quantity sufficient to form a paste, compressing the paste to eliminate voids, drying the paste, and compressing the dried paste at about 500° F. with a pressure of about 15,000 pounds per square inch to form a product having 10 to 60% polytrifluorochloroethylene and 10 to 80% polytetrafluoroethylene.

14. A bearing composition consisting essentially of a coherent compressed mass of powdered polytetrafluoroethylene having a molecular weight ranging from 500,000 to 10,000,000 bonded by a fused mass of polytrifluorochloroethylene having a molecular weight ranging from 76,000 to 110,000 the composition having a coefficient of friction at twenty feet per minute of about 0.26 for hardened stainless steel one quarter inch shafts at room temperature, with a 643 gram load, the percentage of polytrifluorochloroethylene ranging from 10 to 60 and the percentage of polytetrafluoroethylene ranging from 10 to 80.

15. The bearing composition of claim 14, with the rate of bearing wear in milligrams per hour at room temperature with 2000 grams load at 150 revolutions per minute being about 0.0021.

16. An oil- and grease-free bearing composition consisting essentially of a mixture of polytrifluorochloroethylene having a molecular weight ranging from 76,000 to 110,000 and polytetrafluoroethylene, in the proportions by weight of 20 to 60% polytrifluorochloroethylene and 80 to 40% polytetrafluoroethylene.

17. An oil- and grease-free composition consisting of a mixture of polytrifluorochloroethylene having a molecular weight ranging from 76,000 to 110,000 to the amount of 10 to 60% by weight, polytetrafluoroethylene to the amount of 10 to 80% by weight, and a filler selected from the group consisting of molybdenum, tungsten, glass and chromium tetrahydrate to the amount of 0 to 80% by weight.

References Cited in the file of this patent

UNITED STATES PATENTS

| | | |
|---|---|---|
| 2,400,091 | Alfthan | May 14, 1946 |
| 2,400,099 | Brubaker et al. | May 14, 1946 |
| 2,510,078 | Compton et al. | June 6, 1950 |
| 2,531,007 | Strom et al. | Nov. 21, 1950 |
| 2,644,802 | Lontz | July 7, 1953 |
| 2,656,475 | Diehl et al. | Oct. 20, 1953 |
| 2,685,707 | Llewellyn et al. | Aug. 10, 1954 |
| 2,691,814 | Tait | Oct. 19, 1954 |

FOREIGN PATENTS

| | | |
|---|---|---|
| 708,906 | Great Britain | May 12, 1954 |
| 712,426 | Great Britain | July 21, 1954 |